Sept. 13, 1966  E. A. ASH ETAL  3,273,085
TUNABLE CAVITY RESONATOR
Filed April 22, 1964
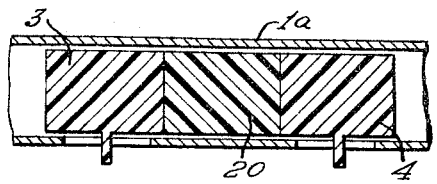
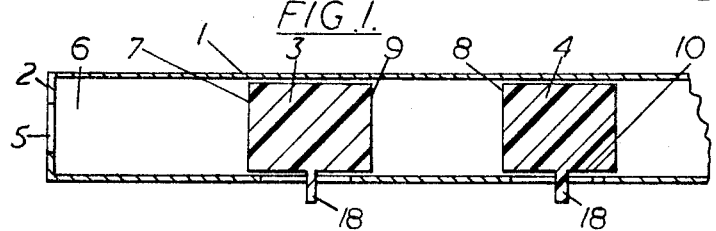
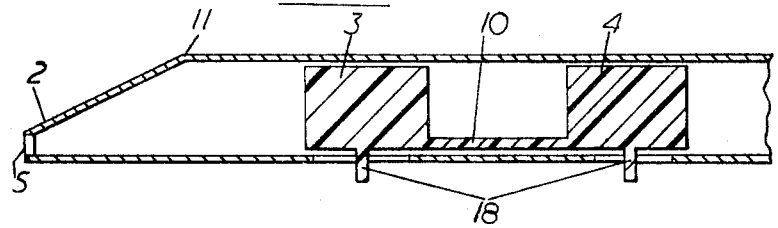
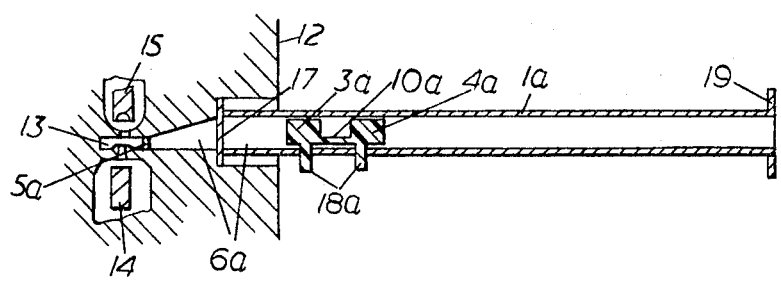
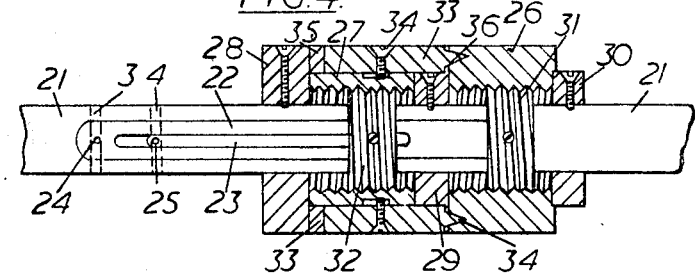
Inventors
ERIC A. ASH
ERIC A. F. SELL
THOMAS M. JACKSON
By LOUIS A. VINTON
Philip M. Bolton
Attorney

United States Patent Office 3,273,085
Patented Sept. 13, 1966

3,273,085
TUNABLE CAVITY RESONATOR
Eric Albert Ash, Eric Andreas Frederik Sell, Thomas Meirion Jackson, and Louis Arthur Vinton, all of London, England, assignors to International Standard Electric Corporation, New York, N.Y., a corporation of Delaware
Filed Apr. 22, 1964, Ser. No. 361,829
Claims priority, application Great Britain, May 13, 1963, 18,875/63
5 Claims. (Cl. 333—83)

The invention relates to tunable cavity resonators.

According to one aspect of the invention, there is provided a tunable cavity resonator including a length of waveguide and a pair of tuning slugs of dielectric material movable longitudinally within the waveguide and together providing a wall for the cavity, and means to adjust the positions of the slugs.

According to a second aspect of the invention, there is provided a tunable reflex klystron having a length of waveguide coupled to its output, a pair of dielectric tuning slugs slidable longitudinally within the waveguide and providing a wall bounding a resonant cavity for the tuning of the klystron, and means to adjust the position of the slugs.

Embodiments of the invention will now be described with reference to the accompanying diagrammatic sectional drawings, in which:

FIG. 1 shows a dielectric-tuned cavity resonator;

FIG. 2 shows another type of dielectric-tuned cavity resonator;

FIG. 3 shows a dielectric-tunable resonator coupled to the output of and tuning a reflex klystron oscillator;

FIG. 4 shows in sections a mechanical arrangement for moving two dielectric tuning slugs in a waveguide either separately or both at once; and FIG. 5 shows another embodiment of a dielectric-tuned cavity resonator.

Referring to FIG. 1, a waveguide 1 in this embodiment of rectangular cross-section is nearly closed at one end by an end-wall 2 and has as a close sliding fit within it a pair of dielectric tuning slugs 3 and 4. The end-wall 2 has a small aperture 5 for coupling, for example, to a second resonator. The tuning slugs are adjustable in position within the guide 1 by the operating tabs 18, 18.

This geometrical configuration defines a cavity resonator 6 in the waveguide 1 bounded by the end-wall 2 at one end and at the other end by a movable end-wall which is one face 7 of the tuning slug 3.

Coupling to or from the cavity 6 is possible both via the coupling aperture 5 and by wave propagation through the slugs 3 and 4. Since partial reflexion occurs for E.M. waves at all the dielectric air interfaces 7, 8, 9 and 10 of the tuning slugs, the positions of all these relative to the fixed end-wall 2 are pertinent in determining the resonant frequency of the cavity 6, and also in determining the impedance of the resonator.

The principal length in determining the resonant frequency of the cavity 6 is the distance between the end-wall 2 and the face 7 of the tuning slug 3. The resonant frequency is approximately that for which this length is $\lambda g/2$ where $\lambda g$ is the wavelength of propagation in the empty waveguide 1. The second slug 4 is preferably spaced from the first slug 3 by about $2\lambda/4$ (for air). This spacing plays a part in determining the impedance of the device.

The resonant frequency is thus varied primarily by adjusting the position of the slug 3 in the waveguide 1, but also by adjusting the position of the second slug 4 relative to the first one. This latter adjustment is found to alter the matching of the cavity, and hence is often desirable.

The lengths of the slugs 3 and 4 along the axis of the waveguide 1 are preferably each $\lambda gd/4$ at the midband operating frequency of the device, where $\lambda gd$ is the guide wavelength within the dielectric.

The air space between the slugs 3 and 4 is preferably $\lambda g/4$ (for air), and this space is ideally adjusted to the altered $\lambda g/4$ when the resonant frequency of the cavity 6 is altered. For this reason the slugs 3 and 4 in this embodiment are independently slidable.

The dielectric material for the tuning slugs should be of low loss since the output is taken by transmission through them. Titania is a suitable material in that it has a low coefficient of absorption and a high dielectric constant at microwave frequencies. Other suitable materials include albumina, titania-loaded polystyrene and magnesium oxide ceramic.

Coupling of electromagnetic energy into the cavity 6 may alternatively be achieved by means, such as a loop projecting into the cavity at a position where there is to be a concentration of magnetic lines of force. At higher microwave frequencies, however, iris or waveguide coupling is preferred owing to the losses associated with coaxial feeders. The output from the cavity 6 may, if desired, be taken otherwise than by waveguide propagation through the tuning slugs.

The arrangement of FIG. 1 may be dimensioned so that the cavity 6 resonates in a harmonic mode, so that the length of the cavity approximates to $n\lambda g/2$ instead of $\lambda g/2$.

Referring now to FIG. 2, this embodiment differs from that of FIG. 1 in two important respects.

First, the two tuning slugs 3 and 4 are joined rigidly by a thin slab of dielectric material 10 so that their spacing is constant, i.e., $\lambda g/4$ at midband; and secondly, the cavity 6 is in part smoothly tapered from having the same cross-section of the waveguide 1 at 11 to having a cross-section approximately equal to that of the input iris 5 at the end 2.

The consequent advantage of mechanical simplicity in being able to slide the slugs 3 and 4 together up and down the waveguide 1 is accompanied by the disadvantage that their spacing cannot be $\lambda g/4$ at more than one frequency. This disadvantage is minimized by arranging the spacing to be $\lambda g/4$, for the centre of the band of resonant frequencies desired. This embodiment, therefore, does not have the facility of matching as mentioned above by moving the second slug relative to the first one. As before, the lengths of the slugs are $\lambda gd/4$ (for the specific dielectric material of the slugs 3 and 4 in the waveguide 1).

The slugs 3 and 4 and the joining piece 10 are in this embodiment made in one piece by milling away the centre portion of a brick-shaped piece of titania until only a wafer of material remains as the joining portion 10. Its actual size and shape is immaterial so long as the slugs are spaced almost completely by air; the portion 10 then does not materially affect the electro-magnetic waves.

Another arrangement found satisfactory and illustrated in FIG. 5, is to join the two slugs 3 and 4 together by a low dielectric constant $\lambda/4$ joining piece 20 which fills the whole guide cross-section like the slugs themselves. The dielectric constant of the material should be low energy absorption. The slugs are then spaced completely by the material instead of by air.

The number of tuning slugs in embodiments such as described in FIG. 1 or FIG. 2 is not restricted to two. However many there are, they are advantageously each $\lambda g/4$ long and similarly spaced.

Referring now to FIG. 3 there is shown a portion of an 8 mm. reflex klystron oscillator having a cylindrical copper block 12 containing a pill-box shaped resonant cavity 13 and the usual electrodes 14 and 15 for projecting and returning an electron beam through the centre of the cavity 13. The resulting electromagnetic oscillations are coupled via an output slot 5a through a tapered channel in the block 12 and a hermetically sealing window 17 to a length of waveguide 1a lying outside the vacuum envelope. Numbers having a suffix a indicate parts analogous to parts in FIG. 2.

The waveguide 1a has slidable within it a pair of close fitting dielectric tuning slugs 3a and 4a of low coefficient of absorption but high dielectric constant. These tuning slugs are joined together by a thin joining portion 10a of the same dielectric material. The body constituting the tuning slugs 3a, 4a has attached to it a pair of operating pegs 18 projecting downwards through a central longitudinal slot (not visible) in one broad side of the waveguide 1a. The operating pegs 18 and the slot enable the slugs 3a and 4a to be slidable in the guide 1a from without.

The circuit from the klystron output slot 5a to the last tuning slug 4a is seen to be similar to the embdiment of FIG. 2, and provides an auxiliary cavity 6a to tune the klystron frequency as follows.

The resonant frequency of the cavity 6a lying between the slot 5a and the tuning slugs affects the resonant frequency of the klystron cavity 13, and so affects the frequency of oscillations of the klystron. Thus the klystron output may be tuned in frequency without mechanically disturbing the klystron (except perhaps to alter the bias on the electrode 15).

The output of the klystron is taken from the right hand end of the guide 1a by transmission through the tuning slugs 3a and 4a. A waveguide coupling flange 19 is shown for this purpose.

The klystron construction shown, where the resonant cavity and the electrode cavities are hollowed out of a solid copper block facilitates accurate batch production but renders difficult the tuning of the cavity 13 by altering its inner dimensions. Hence the cavity 6′ provides a convenient means for tuning such klystrons.

In the embodiment shown in FIG. 3, the cavity 6a is defined partly by the waveguide 1a and the slugs 3a and 4a, and partly by the iris 5a and the tapered channel which are physically part of the klystron.

Methods of moving the tuning slugs in the waveguide other than by operating attached pegs projecting through a slot in the waveguide, either together or separately will occur to those skilled in waveguide techniques.

One further method is now described with reference to FIG. 4 wherein separate adjusting screws for moving each slab can be gauged together to move the slabs at the same time and maintain their spacing.

FIG. 4 shows a length of circular waveguide 21 having slidable within it close fitting circular tuning slugs shown as hidden detail at 3 and 4, the slug 3 being the closer one to a coupled klystron oscillator (not shown) to the left. The tuning slugs are independently and remotely adjustable in longitudinal position within the guide by a mechanical arrangement attached to the guide and shown in section in FIG. 4.

The arrangement includes coaxial actuating rods 22, 23, the outer of which is unrotatably slidable in a longitudinal locating groove (not visible in FIG. 4) in the waveguide 21. At the centre of the groove runs a slot through which project operating tabs attached to the dielectric tuning slugs 3 and 4. The operating tabs are attached to the ends of the respective rods, 22, 23 at 24, 25, the former rod having a longitudinal slot through which passes the operating tab attached to the latter rod.

The actuating rods 22, 23 are independently slidable relative to the length of the guide 21 by rotation of either of two nut members 26, 27 which are held in fixed longitudinal positions on the guide 21 by fixed abutment pieces 28, 29 and 30. The nut members 26, 27 cooperate when rotated with corresponding bolt members 31, 32 fixed to the actuating rods 22, 23 respectively at their ends remote from the tuning slugs 3 and 4. The nut member 27 is surrounded by an operating sleeve 33 which has a set screw 34 entering a short longitudinal groove in the nut member 27. The operating sleeve can thus slide lengthwise without rotating relative to the nut member. Between the abutment piece 28 and the sleeve 33 is a spring washer 35 which allows a certain degree of lengthwise sliding of the sleeve against its compression. Spigots 36 on the sleeve 33 normally engage the other nut member 26 but on manually pushing the sleeve 33 against the spring washer 35, the spigots 36 are disengaged from the nut member 26 and only then is relative rotation between the two nut members possible, since the sleeve 33 always engages the nut member 27.

In operation to tune the klystron to which the waveguide 21 is coupled, the slug 4 is first moved alone by rotating the sleeve 33 while pushing it against the spring washer 35 thus keeping it disengaged from the nut member 26. The slug 4 is moved until correct matching is achieved. The sleeve 33 is then allowed to engage the nut member 26 and both slugs are moved at this spacing until the desired tuning point is reached. The nut member 26 may then be again disengaged and the tuning slug 4 adjusted alone for better matching to the klystron output but this final step is not usually found necessary. The matching may necessitate slight retuning i.e. moving the slugs in unison again.

This repetition is because tuning the klystron may have second order effects on matching and vice versa. Such interdependence of variables in microwave tube techniques is well known and merits no further comment.

It is repeated that the length of waveguide in which the tuning slugs slide may be circular or rectangular in crosssection. The slug should fill the guide when sliding easily. Smooth transitioning between small and large cross-sections, and between different-shaped cross-sections are also well-known in the waveguide art.

An 8 mm. reflex klystron has been tuned over a 3% bandwidth giving at least ½ watt using apparatus as shown in FIG. 4.

What we claim is:

1. A tunable cavity resonator comprising a length of waveguide and a pair of tuning slugs of dielectric material movable longitudinally within the waveguide, one of said tuning slugs providing a wall for the cavity, said slugs being spaced by a dielectric member joining them and means to adjust the positions of the slugs.

2. A resonator according to claim 1 wherein said joining member is composed of a material having a lower dielectric constant than said tuning slug and is of the same cross-section as said slugs.

3. A tunable cavity resonator according to claim 1 wherein said tuning slugs and said joining member are of the same material, said joining member having a small cross-section perpendicular to the waveguide length.

4. A tunable cavity resonator according to claim 3 wherein said tuning slugs and said joining member are constituted by a rectangular parallelopiped of dielectric material from which a central portion has been removed.

5. A tunable cavity resonator according to claim 1 wherein the dielectric material is titania.

References Cited by the Examiner

UNITED STATES PATENTS

| | | | |
|---|---|---|---|
| 2,508,346 | 5/1950 | Lafferty | 315—5.22 |
| 2,807,745 | 9/1957 | Moll | 315—5.22 |
| 2,843,794 | 7/1958 | Hergenrother | 315—5.22 |
| 2,866,123 | 12/1958 | McCann | 315—5.22 |
| 3,166,725 | 1/1965 | Engen | 333—98 |

FOREIGN PATENTS

| | | |
|---|---|---|
| 448,415 | 5/1958 | Canada. |
| 434,225 | 4/1948 | Italy. |

HERMAN KARL SAALBACH, *Primary Examiner.*

L. ALLAHUT, *Assistant Examiner.*